United States Patent [19]

Nicoud espouse Le Brasseur

[11] 4,017,469
[45] Apr. 12, 1977

[54] PHOTODEGRADABLE POLYOLEFIN COMPOSITIONS

[75] Inventor: Geneviéve Nicoud espouse Le Brasseur, Bully-les-Mines, France

[73] Assignee: Ethylene Plastique, Courbevoie, France

[22] Filed: July 2, 1974

[21] Appl. No.: 485,103

[30] Foreign Application Priority Data

July 9, 1973 United Kingdom ............ 32589/73

[52] U.S. Cl. .................... 526/19; 260/DIG. 43; 526/44; 526/49; 526/55; 526/914
[51] Int. Cl.² ........................................ C08J 3/20
[58] Field of Search ............ 260/DIG. 43, 94.9 GC, 260/88.1 R, 88.1 P, 88.1 PC, 88.1 PE, 93.1, 93.5 R, 93.7

[56] References Cited

UNITED STATES PATENTS

| | | | |
|---|---|---|---|
| 3,549,376 | 12/1970 | Roos | 96/115 R |
| 3,797,690 | 3/1974 | Taylor et al. | 260/DIG. 43 |
| 3,830,764 | 8/1974 | Hudgin et al. | 260/DIG. 43 |
| 3,935,141 | 1/1976 | Potts et al. | 260/23 H |

FOREIGN PATENTS OR APPLICATIONS

| | | | |
|---|---|---|---|
| 770,202 | 5/1971 | Belgium | 260/DIG. 43 |
| 2,244,801 | 3/1973 | Germany | 260/DIG. 43 |

OTHER PUBLICATIONS

Chem. Abstracts vol. 75, 1971, Reyniers et al., p. 146270h.
Chem. Abstracts vol. 74, 1971, Levinos, p. 17226d.

Primary Examiner—Eugene C. Rzucidlo
Attorney, Agent, or Firm—Brooks Haidt Haffner & Delahunty

[57] ABSTRACT

Photodegradable polyolefin compositions are described which comprise from 5 to 500 ppm of iron in the form of an alkali metal, preferably potassium, trioxalatoferrate and from $5 \times 10^{-5}$ to $5 \times 10^{-3}$ mol per 100 g of polyolefin of a photosensitizing organic compound having a triplet energy of at least 30 Kcal/mol, such as certain aromatic ketones or aldehydes, certain organic nitro derivatives or dyestuffs, or certain aromatic hydrocarbons.

9 Claims, No Drawings

PHOTODEGRADABLE POLYOLEFIN COMPOSITIONS

The present invention relates to photodegradable polyolefin compositions.

Photodegradable plastics compositions, for example based on polyolefins, are of obvious value for several reasons; thus such compositions enable environmental pollution due to discarded packagings and objects made of such plastics to be counteracted and plastics films to be used to the best advantage in agriculture, for example for mulching.

It is known that plastics compositions can be made photodegradable by adding any of a number of non-ionic organo-soluble metal complexes which are capable of acting as photolysis initiators. However, although the various non-ionic organo-soluble complexes known hitherto do, in fact, have a photodegrading action, they also possess considerable disadvantages; in particular, these complexes are often unstable at the temperatures reached during the processing of polyolefins and they decompose and, in turn, cause the thermal decomposition of the polyolefins to which they are added. If, in order to overcome the phenomena of thermo-oxidation caused by such decomposed complexes, effective anti-oxidants are added to the plastics compositions, a mixture is obtained, the behaviour of which is difficult to predict and to reproduce, due to the antagonistic effects of the additives.

We have now developed photodegradable polyolefin compositions, the photodegradability of which is predictable and can, therefore, be chosen as desired.

According to the present invention, therefore, we provide a photodegradable polyolefin composition which contains, in addition to the polyolefin, from 5 to 500 ppm of iron in the form of at least one alkali metal trioxalatoferrate and from $5 \times 10^{-5}$ to $5 \times 10^{-3}$ mol (per 100 g of the polyolefin) of at least one photosensitizing organic compound having a triplet energy of at least 30 Kcal/mol.

The polyolefins which may be used in the compositions according to the invention are homopolymers of olefins, such as polyethylene, polypropylene, polybutene and polystyrene, and copolymers of olefins with one another and with other copolymerisable monomers, such as vinyl esters, vinyl ethers, acrylic and methacrylic esters, acrylonitrile and maleic anhydride.

Alkali metal trioxalatoferrates, which may also be referred to as alkali metal ferri-oxalates, have the formula $[Fe(C_2O_4)_3]A_3 \cdot nH_2O$, where A is an alkali metal and $n$ is the number of molecules of water of crystallisation. These compounds have, by themselves, only a very slight photodegrading action on polyolefins at the concentrations indicated and, for this reason, could not be used alone in order to obtain a polyolefin composition which was photodegradable at an acceptable rate. The compounds are compatible with polyolefins; they are subject to little or no thermal degradation at the temperatures at which polyolefins are processed and, for this reason, do not have any significant effect on the rate of thermal degradation of polyolefins. The preferred alkali metal trioxalatoferrate is potassium trioxalatoferrate.

In addition to the alkali metal trioxalatoferrate, the polyolefin composition according to the invention also contains at least one photosensitizing organic compound having a triplet energy of at least 30 Kcal/mol.

The photosensitizing organic compounds used are organic compounds which are capable of absorbing UV-radiation to give an excited molecule which, in turn, is capable of transferring its energy to a neighbouring molecule in order to excite the latter. Such compounds are known and are described, for example, in the book by Calvert and Pitts, entitled *Photochemistry*, Wiley and Sons, 1967, page 298.

The photosensitizing compounds which may be used according to the invention include, for example: aromatic ketones and aldehydes, such as xanthone, acetophenone, benzophenone, and benzaldehyde, aromatic hydrocarbons, such as naphthalene, fluorene and anthracene, and nitro derivatives and dyestuffs, such as nitrodecane, nitrobenzene, nitroanisole, and Naphthol Yellow S.

This list is not exhaustive and is given by way of example.

The photosensitizing compounds may, in certain cases, have a photodegrading action on polyolefins, but this action is insufficient for practical purposes when such compounds are used on their own.

The alkali metal trioxalatoferrate is used in a concentration such that the polyolefin contains from 5 to 500 ppm of iron; the photosensitizing compound is used in a concentration of $5 \times 10^{-5}$ to $5 \times 10^{-3}$ mol/100 g of polyolefin; tests have shown that the relative quantities of the two additives is not of particular importance in the concentration ranges mentioned. Since both types of additive absorb light radiation received by articles formed of the composition according to the invention, it is, in general, pointless to employ amounts of the additives greater than the amounts which, for the article in question, lead to complete absorption of the light radiation received by the article.

The experimental results obtained with compositions according to the invention do not enable the mechanism by which the additives bring about the photodegradation of polyolefins, to be determined with precision, but they do suggest the following hypotheses:

(i) the photosensitizing compound has the function of inducing photochemical oxidation reactions affecting the polyolefin, (ii) the alkali metal trioxalatoferrate is itself converted into an alkali metal ferro-oxalate by the action of light on the additive in the solid state, (iii) the alkali metal ferro-oxalate is dissolved by the polyolefin oxidation products and this leads to an autocatalytic degradation of the polyolefin; the degradation is thus slow to start, but then takes place faster and faster.

The rate of degradation of the photodegradable composition according to the invention can be controlled by changing the concentrations of the additives used, other things being equal. Since the alkali metal trioxalatoferrate is present in the polyolefin, in solid form, the rate of degradation depends, other things being equal, on the granulometry of the alkali metal trioxalatoferrate used.

It is, of course, possible to add to the photodegradable polyolefin composition other known additives, such as anti-oxidants, slip agents, and the like. For those additional additives which have a significant capacity for UV-radiation absorption, the formulation of the composition should take this in account in order to obtain the desired rate of degradation.

The mixture of polymer and additives according to the invention may be prepared in accordance with conventional polymer processing practice, by intimately mixing the molten polymer and the additives in as homogenous a manner as possible. Such mixing may be carried out by kneading, calendering, pressing or the like, at a temperature such that the additives do not decompose. In general, all the additives are added simultaneously or in a definite order when that seems desirable.

In the following examples, polyolefin compositions were prepared and tested as follows:

The polymer and the additives were mixed at the chosen temperature for a definite period of time in a small laboratory Brabender mixer (polyethylene, 20 minutes at 120° C; polypropylene, 2 minutes at 190° C). The composition obtained was ground in a Thomas mill and then moulded into sheets having a thickness of 500 μ in a laboratory press. Dumb-bell shapes were cut out of the sheet according to standard specification NF-T-034 for the determination of mechanical properties. The mechanical properties tested were the elongation at break (EB %) expressed as a % of the length of the original test piece and the breaking load (BL kg/cm$^2$) expressed in kilograms per square centimeter.

The dumb-bell shapes were irradiated at 50° C and 60% relative humidity for a definite period of time in a Weather-O-Meter (W.O.) of the ATLAS 600 WR type. In this apparatus, the composition of the filtered radiation from the xenon lamp is very close to that of solar radiation. After irradiation, the elongation at break of the dumb-bell shapes was again measured and was related to the measurement made on the same sample before irradiation, the latter measurement being taken as equal to 100.

The results given in the tables below are the averages of the results of at least 4 measurements.

The non-thermo-oxidising properties of the additives used were determined as follows: 100 g of pure polyethylene were calendered for 2 minutes on a laboratory calender maintained at 180° C. The additives were added. Calendering was continued for about 1 hour. Samples of about 5 g were taken just before the introduction of the additives and then at 10 minute intervals thereafter. Using these samples, the melt index at 190° C was determined according to standard specification NF 51-016. The variations in the melt index were compared with those of the same polyethylene without additive.

The following examples are given by way of illustration only:

EXAMPLE 1

Either pure polyethylene (density 0.92, melt index 2) or the same polyethylene to which 100 ppm of iron in the form of potassium trioxalatoferrate had been added, was worked on a calender as described above.

The stability of the compositions obtained to thermo-oxidation is given in Table I (stability determined on the calender).

TABLE I

| Melt index of the product as a function of the duration of calendering (in minutes). | | | | |
|---|---|---|---|---|
| Time | 2 | 10 | 30 | 50 |
| Pure polyethylene | 1.9 | 1.73 | 0.95 | 0.25 |
| Polyethylene + potassium trioxalatoferrate | 1.89 | 1.70 | 1.2 | 0.50 |

The effect of potassium trioxalatoferrate and certain photosensitizing agents was also tested on the same polyethylene, by means of tests carried out on the Weather-O-Meter (200 hours of irradiation). The amount of potassium trioxalatoferrate used corresponded to 100 ppm of iron; the amount of each of the photosensitizing agents used was $5 \times 10^{-4}$ mol per 100 g of polyethylene. The processing conditions were as described above. The results are given in Table II.

TABLE II

| | Elongation at break % |
|---|---|
| Pure polyethylene (density 0.92, melt index 2) | −5% |
| Polyethylene + potassium trioxalatoferrate | −3% |
| Polyethylene + xanthone | −22% |
| Polyethylene + acetophenone | −60% |
| Polyethylene + benzophenone | −32% |

EXAMPLE 2

Tests were carried out using the Weather-O-Meter (duration of irradiation 200 hours) on polyethylene (density 0.92, melt index 2) containing 100 ppm of iron in the form of potassium trioxalatoferrate and $5 \times 10^{-4}$ mol (per 100 g of polyethylene) of each of a number of photosensitizing agents. The results obtained are given in Table III.

TABLE III

| Additives | Elongation at break % |
|---|---|
| Potassium trioxalatoferrate and xanthone | −84% |
| Potassium trioxalatoferrate and acetophenone | −82% |
| Potassium trioxalatoferrate and benzophenone | −91% |
| Potassium trioxalatoferrate and benzaldehyde | −86% |

Tests on a calender as described above were carried out with two of these same mixtures; the results obtained are given in Table IV.

TABLE IV

| Melt index as a function of the duration of calendering in minutes | | | | |
|---|---|---|---|---|
| Duration | 2 | 10 | 30 | 50 |
| Potassium trioxalatoferrate and xanthone | 1.85 | 1.75 | 1.25 | 0.8 |
| Potassium trioxalatoferrate and benzophenone | 1.88 | 1.83 | 1.58 | 0.9 |

EXAMPLE 3

The effect of potassium trioxalatoferrate and certain nitro derivatives and a certain dyestuff was tested, as in Example 1, by means of tests carried out as described above with a Weather-O-Meter (duration of the irradiation 200 hours). The amount of potassium trioxalatoferrate used corresponded to 100 ppm of iron; the amount of nitro derivative or dyestuff was $5 \times 10^{-4}$ mol per 100 g of polyethylene. The results obtained are given in Table V.

TABLE V

| | Elongation at break % |
|---|---|

Pure polyethylene (density 0.92

TABLE V-continued

| | Elongation at break % |
|---|---|
| melt index 2) | −5% |
| Polyethylene + potassium trioxalatoferrate | −3% |
| Polyethylene + nitrodecane | −0% |
| Polyethylene + nitrobenzene | −19% |
| Polyethylene + nitroanisole | −0% |
| Polyethylene + Naphthol Yellow S | −3% |

EXAMPLE 4

Mixtures of the same polyethylene as that used in Example 1 were made up with potassium trioxalatoferrate (100 ppm of iron) and $5 \times 10^{-4}$ mol per 100 g of polyethylene, of the dyestuff and of one of the nitro derivatives mentioned in Example 3.

The tests were carried out on a calender as described above; the results obtained are given in Table VI.

TABLE VI

| Melt index of the product as a funtion of the duration of calendering (in minutes) | | | | |
|---|---|---|---|---|
| Time | 2 | 10 | 30 | 50 |
| Potassium trioxalatoferrate and Naphthol Yellow S | 1.85 | 1.75 | 1.40 | — |
| Potassium trioxalatoferrate and nitroanisole | 1.85 | 1.81 | 1.52 | 0.87 |

After aging in a Weather-O-Meter (duration of irradiation 200 hours), these mixtures (and similar mixtures containing two of the three nitro derivatives mentioned in Example 3) gave the results listed in Table VII.

TABLE VII

| Additives | Elongation at Break % |
|---|---|
| Potassium trioxalatoferrate and nitrodecane | −78% |
| Potassium trioxalatoferrate and nitrobenzene | −78% |
| Potassium trioxalatoferrate and nitroanisole | −36% |
| Potassium trioxalatoferrate and Naphthol Yellow S | −83% |

EXAMPLE 5

Mixtures of pure polyethylene having a density of 0.92 and a melt index of 2 and 100 ppm of iron in the form of potassium trioxalatoferrate and $5 \times 10^{-4}$ mol of fluorene, naphthalene or anthracene per 100 g of polyethylene, were made up and aged in a Weather-O-Meter (duration of irradiation 200 hours) as described above. The results obtained are given in Table VIII.

TABLE VIII

| Additives | Elongation at break after 200 hours irradiation |
|---|---|
| Potassium trioxalatoferrate + fluorene | −70% |
| Potassium trioxalatoferrate + naphthalene | −51% |
| Potassium trioxalatoferrate + anthracene | −76% |

The photodegradable compositions according to the invention can be used in the form of films or compression or injection moulded articles; the fabrication conditions used to form such films or articles may be essentially the same as would be suitable for making similar products from the polyolefin in question without the additives.

What is claimed is:

1. A photodegradable polyolefin composition which is degraded on exposure to solar radiation so as to counteract environmental pollution, which comprises, in addition to the polyolefin,
   i. from about 5 to about 500 ppm of iron in the form of at least one alkali metal trioxalatoferrate, and
   ii. from about $5 \times 10^{-5}$ to about $5 \times 10^{-3}$ mol, per 100 g of the polyolefin, of at least one photosensitizing organic compound having a triplet energy of at least about 30 Kcal/mol.

2. A composition as set forth in claim 1, wherein said photosensitizing compound is selected from the group consisting of aromatic ketones and aldehydes.

3. A composition as set forth in claim 2, wherein said photosensitizing compound is selected from the group consisting of xanthone, acetophenone, benophenone and benzaldehyde.

4. A composition as set forth in claim 1, wherein said photosensitizing compound is an organic nitro derivative.

5. A composition as set forth in claim 4, wherein said photosensitizing compound is selected from the group consisting of nitrodecane, nitrobenzene, nitroanisole and Naphthol Yellow S.

6. A composition as set forth in claim 1, wherein said photosensitizing compound is an aromatic hydrocarbon.

7. A composition as set forth in claim 6, wherein said photosensitizing compound is selected from the group consisting of fluorene, naphthalene and anthracene.

8. A film formed of a photodegradable polyolefin composition as set forth in claim 1.

9. A moulded article formed of a photodegradable polyolefin composition as set forth in claim 1.

* * * * *

UNITED STATES PATENT OFFICE
CERTIFICATE OF CORRECTION

PATENT NO. : 4,017,469
DATED : April 12, 1977
INVENTOR(S) : GENEVIEVE LE BRASSEUR It is certified that error appears in the above-identified patent and that said Letters Patent are hereby corrected as shown below:

Column 5, line 22, correct the spelling of "function".

Column 5, line 31, change "three" to --other--.

Column 6, line 34, correct the spelling of "benzophenone".

Signed and Sealed this

Twenty-ninth Day of November 1977

[SEAL]

Attest:

RUTH C. MASON
Attesting Officer

LUTRELLE F. PARKER
Acting Commissioner of Patents and Trademarks